United States Patent [19]

Naito et al.

[11] 4,416,243

[45] Nov. 22, 1983

[54] VACUUM CONTROL VALVE

[75] Inventors: Mitikatu Naito, Nagoya; Kiyotosi Yano; Kazuo Itou, both of Kariya, all of Japan

[73] Assignee: Nippondenso Co., Ltd., Kariya, Japan

[21] Appl. No.: 370,069

[22] Filed: Apr. 20, 1982

[30] Foreign Application Priority Data

Apr. 21, 1981 [JP] Japan .................... 56-57729[U]

[51] Int. Cl.³ .......................................... F02M 25/06
[52] U.S. Cl. ..................................... 123/569; 123/568
[58] Field of Search ........................ 123/568, 569, 571

[56] References Cited

U.S. PATENT DOCUMENTS 4,269,159 5/1981 Skinner .............................. 123/569
4,280,470 7/1981 Ueda .................................. 123/569

FOREIGN PATENT DOCUMENTS 57-49548 3/1982 Japan ................................ 123/569
2075592 11/1981 United Kingdom ............... 123/569

Primary Examiner—Wendell E. Burns
Attorney, Agent, or Firm—Cushman, Darby & Cushman

[57] ABSTRACT

A vacuum modulating chamber of a vacuum control valve is communicated with a diaphragm chamber of a EGR valve for controlling an amount of exhaust gas to be recirculated into combustion chambers of an engine, so that a modulated negative pressure is applied thereto. The chamber is provided with a diaphragm deflected responding to the negative pressure in the chamber. The vacuum control valve is further provided with a cam member and a spring which urges the diaphragm in one direction so as to change a value at which the pressure in the vacuum modulating chamber is controlled, wherein a diameter of the cam member is larger than that of the diaphragm.

3 Claims, 1 Drawing Figure

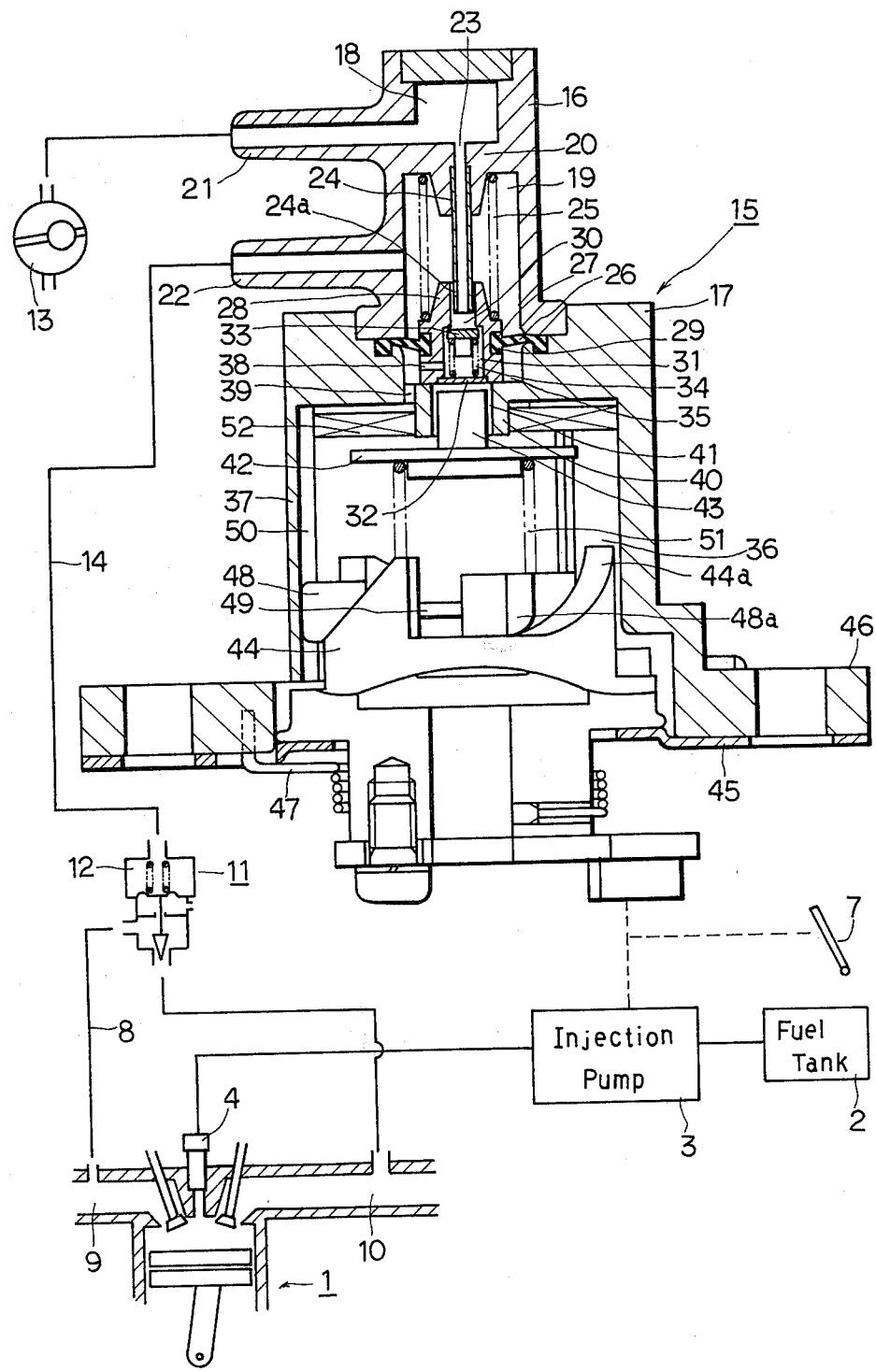

VACUUM CONTROL VALVE

BACKGROUND OF THE INVENTION

The present invention relates to a vacuum control valve for automatically varying value of negative pressure from a vacuum source such as a vacuum pump. The invention relates in particular to a vacuum control valve used with an exhaust gas recirculation valve (hereinafter referred to as EGR valve) and for controlling the negative pressure of the vacuum applied to the EGR valve.

Recently it has become necessary to purify exhaust gases from Diesel engines and many experiments have been made for the purpose. One of the difficulties for Diesel engines is that a vacuum source, such as an intake negative pressure representing an operational load of an engine, is not present in Diesel engines. Therefore it is necessary for Diesel engines to provide a vacuum pump driven by the engine and a vacuum control valve for modulating the negative pressure from the vacuum pump in order to produce such a negative pressure as representing an operational load of the engine.

Such a vacuum control valve is proposed in a Japanese prior application (Japanese Utility Model Application No. 55-127027, published on Mar. 19, 1982 under Publication No. 57-49548). In the known vacuum control valve, a preset load for a diaphragm is changed by an angular rotation of a cam which is linked with an acceleration pedal or a control rack of a fuel injection pump for a Diesel engine, so that a negative pressure representing an operational load of the engine can be obtained. However, this known vacuum control valve has the following drawbacks: A life of a cam or a cam follower is relatively short, since a diameter of the diaphragm is relatively large and thereby a spring constant of a spring is large and accordingly the cam follower is in contact with the cam by a large contact force. When the diameter of the diaphragm is reduced to decrease the spring constant, and also when the diameter of the cam is reduced correspondingly, a slope of a cam surface becomes larger for obtaining the same amount of an axial movement of the cam follower, and thereby a smooth movement of the cam follower on the cam surface is prevented.

SUMMARY OF THE INVENTION

With a view to overcoming the above drawbacks, it is a primary object of the present invention to provide a vacuum control valve in which a diameter of a diaphragm is relatively small to make small a spring constant of a spring biasing the diaphragm in one direction and thereby a contacting force between a cam and a cam follower is small. Furthermore in the vacuum control valve according to the invention, a diameter of the cam is larger than that of the diaphragm and thereby a slope of the cam surface is kept at a small value which ensures a smooth movement of the cam follower with respect to the cam surface.

The above and other objects and features of the invention will become more apparent from the following description in reference to an accompanying drawing.

BRIEF DESCRIPTION OF DRAWING

An accompanying drawing is a schematic view of one embodiment according to the invention, in which a vacuum control valve is shown as a sectional view.

DETAILED DESCRIPTION OF PREFERRED EMBODIMENT

In the accompanying drawing, numeral 1 designates a Diesel engine, 2 a fuel tank, 3 a fuel pump for injecting fuel into combustion chambers of the engine 1 through a fuel injection nozzle 4. A control lever of the fuel pump 3 is mechanically linked with an acceleration pedal 7 by means of a rod, for example, so that an amount of fuel injected into combustion chambers is controlled by depression of the acceleration pedal 7. Numeral 8 designates an exhaust gas recirculation passage for connecting a portion of an intake pipe 10 with a portion of an exhaust pipe 9 and provided in the passage 8 is a EGR valve 11 for opening and closing the passage 8 in order to control the amount of exhaust gas to be recirculated into the combustion chambers. The EGR valve 11 has a diaphragm chamber 12 into which vacuum from a vacuum source 13, such as a vacuum pump driven by the engine, is introduced through a vacuum control valve 15, so that the amount of the recirculated exhaust gas depends on the degree of negative pressure in the diaphragm chamber 12. Numeral 14 designates a vacuum line for connecting the diaphragm chamber 12 with the control valve 15.

Now the vacuum control valve 15 will be explained in detail. The valve 15 is comprised of a cover 16 and a housing 17, which are fixed with each other by a suitable means, for example, bolts, adhesive materials and so on. The cover 16 is of a cylindrical form and is formed therein with two compartments 18 and 19 divided by a partition wall 20, wherein the compartment 19 acts as a vacuum modulating chamber, as apparent from the description below. A vacuum port 21 and an output port 22 are also provided on the cover 16 so that the first and second compartments 18 and 19 are respectively communicated with the vacuum pump 13 and the diaphragm chamber 12 through the respective ports. The partition wall 20 is provided with a hole 23, to which a pipe 24 is connected, so that two compartments 18 and 19 are communicated with each other therethrough.

A diaphragm 26 is interposed between the cover 16 and the housing 17, whose outer periphery is secured to the housing 17 by ultra-sonic welding. The diaphragm 26 is formed with an opening at its center surrounded by a circular rim 27, which is coupled with and secured to an annular groove 29 of a cylindrical movable member 28. The cylindrical movable member 28 is formed with a small-diameter portion 30 as a valve port and a large-diameter portion 31 as a valve chamber, which are axially aligned with each other. A lower end 24a of the pipe 24 projects into the small-diameter portion 30, wherein an outer diameter of the pipe 24 is slightly smaller than an inner diameter of the small-diameter portion 30 so that the movable manner 28 can move upwardly and downwardly with respect to the pipe and air may flow through an annular space defined by the inner surface of the small-diameter portion 30 and the outer surface of the pipe.

A cover plate 32 is fixedly secured to the lower end of the large-diameter portion 31. A valve body or a valve member 33 is disposed in the large-diameter portion 31, being biased upwardly by a spring 34, so that the valve body 33 seats on the lower end of the small-diameter portion 30 acting as a valve seat. a spring 25 is disposed in the second compartment 19 for urging the movable member 28 downwardly.

A recess 35 is formed in a top wall of the housing 17, within which the lower part of the movable member 28 is disposed. The housing 17 is of a cup-shape, forming a cam chamber 36 defined by the top wall and cylindrical side wall 37.

The cylindrical movable member 28 is further formed with a hole 38 for communicating the inside space defined by the large-diameter portion 31 and the cover plate 32 with a space defined by the recess 35 and the diaphragm 26. A release port 39 is formed in the top wall of the housing 17 so that the inside space of the large-diameter portion 31 is communicated with the cam chamber 36 through the hole 38 and the release port 39.

A circular protrusion 40 is formed on the lower side of the top wall, forming therein a guide hole 41, into which a guide portion 43 of a spring holder 42 is inserted and by which the spring holder 42 is guided for the axial movement thereof.

A cam member 44 is rotatably disposed in the cam chamber 36 and held in place by a plate 45 secured to flange portions 46 of the housing 17. The cam member 44 is formed with a plurality of cam surfaces 44a with which corresponding number of cam followers 48 are contacted. The cam followers 48 are fixed to a movable plate 49, while each outer end 48a of the followers 48 is engaged with each axial guide groove 50 formed on the inner side wall 37 of the housing 17 so that the movable plate 49 is allowed to move only in an axial direction when the cam member 44 is rotated. A compression coil spring 51 is disposed between the spring holder 42 and the movable plate 49 for pushing the spring holder 42 upwardly so that the top surface of the guide portion 43 is in contact with the cover plate 32.

A spring 47 connected between the housing 17 and the cam member 44 biases the latter in such a direction that the movable plate 49 moves downwardly. The cam member 44 is so linked with the acceleration pedal 7 that the cam member 44 is rotated by a depression of the pedal 7 in a direction opposite to the biasing direction of the spring 47, whereby when the cam member 44 is rotated, the movable plate 49 is moved upwardly.

A numeral 52 designates an air filter element disposed in the cam chamber 36 for filtering the air flowing into the large-diameter portion 31 through the release port 39 and the hole 38. The cam chamber 36 is communicated with the atmosphere through apertures (not shown) formed on the side wall 37.

An operation of the above-described device will be explained hereinafter. A negative pressure is supplied to the first compartment 18 through the port 21 from the vacuum pump 13 driven by the engine 1. the negative pressure in the compartment 18 is then introduced into the second compartment 19 through the hole 23 and the pipe 24. When the negative pressure in the second compartment 19 exceeds a biasing force of the spring 25 the movable member 28 is moved upwardly and when the negative pressure in the compartment 19 reaches a predetermined value, the valve body 33 becomes in contact with the lower end of the pipe 24. When the negative pressure in the compartment 19 becomes greater than the predetermined value, the movable member 28 is moved further upwardly and the valve body 33 is separated from its valve seat so that the atmospheric pressure is introduced into the compartment 19 from the large-diameter portion 31 through the annular space between the inner surface of the small-diameter portion 30 and the outer surface of the pipe 24. And therefore, the negative pressure in the compartment 19 becomes smaller, to thereby move the movable member 28 downwardly so that the valve body 33 seats on the valve seat again to shut the communication between the small-diameter portion 30 and the large-diameter portion 31. Repeating the above operation, the pressure in the compartment 19 is maintained substantially at the predetermined value, which is determined by the preset load of the spring 25 and the spring 51. This preset load can be changed by rotating the cam member 44, that is, when the cam member 44 is rotated to move the movable plate 49 upwardly, the preset load of the spring 25 urging the diaphragm 26 downwardly is decreased so that the pressure in the compartment 19 is maintained at a lower value (at a higher value as an absolute pressure).

The negative pressure, modulated as described above, in the compartment 19 is introduced into the diaphragm chamber 12 of the EGR valve 11 through the output port 22, to control the amount of exhaust gases to be recirculated into the combustion chamber of the engine in response to the negative pressure in the chamber 12. Since the cam member 44 is linked with the acceleration pedal 7, the rotational angle thereof responds to the degree of the depression of the pedal and accordingly the amount of exhaust gases to be recirculated is also responding to the depression degree of the pedal 7.

In the embodiment described above, the diameter of the diaphragm 26 is relatively small so that such a spring as having a small spring constant can be used as the spring 25. By the same reason, a spring constant of the spring 51 is relatively small. Furthermore, since the diameter of the cam member 44 is relatively large (larger than that of the diaphragm 26), the height of the cam surface 44a can be gradually increased to obtain a certain axial movement of the movable plate 49, so that the cam followers 48 can smoothly move on the cam surfaces and a long-life cam member and cam followers can be obtained.

What is claimed is:

1. A vacuum control valve for controlling an amount of exhaust gas to be recirculated into combustion chambers of an engine comprising:

a cover and a housing;

a vacuum port formed on said cover and to be connected with a vacuum source;

an output port formed on said cover and to be connected with a diaphragm chamber of a EGR valve of said engine;

a vacuum modulating chamber formed in said cover and communicated with said output port and having a diaphragm;

a movable member coupled with an opening of said diaphragm so as to be moved with said diaphragm, said movable member having therein a valve chamber and a valve port opening to said vacuum modulating chamber, said movable member further having a hole for communicating said valve chamber with the atmosphere;

a valve member disposed in said valve chamber and facing to said valve port;

a first spring disposed in said valve chamber for biasing said valve member towards said valve port;

a pipe disposed in said vacuum modulating chamber, one end thereof being communicated with said vacuum port and the other end projecting into said valve port for introducing a negative pressure from said vacuum source into said vacuum modulating chamber;

a second spring disposed in said vacuum modulating chamber and biasing said movable member in such a direction that said movable member is moved away from said pipe, whereby when the negative pressure in said vacuum modulating chamber exceeds a preset load determined by the biasing force of said second spring said valve member seats on said other end of said pipe for cutting off the communication between said vacuum port and said vacuum modulating chamber and said vacuum modulating chamber is communicated with said valve chamber for introducing the atmospheric pressure into said vacuum modulating chamber through said valve port, thereby to modulate the pressure in said vacuum modulating chamber at a predetermined value in accordance with said preset load;

a cam chamber formed in said housing;

a cam member rotatably disposed in said cam chamber and being linked with an acceleration pedal, wherein a diameter of said cam member is larger than that of said diaphragm;

a cam follower means disposed in said cam chamber and having a cam follower being in contact with a cam surface of said cam member;

a spring holder disposed in said cam chamber;

a guide hole formed in a wall of said housing into which a guide portion of said spring holder is inserted and by which said spring holder is guided, so that the end of said guide portion is in contact with said movable member; and, a third spring disposed in said cam chamber and between said cam follower means and said spring holder for urging said spring holder in a direction opposite to the biasing direction of said second spring, whereby when said cam member is rotated the urging force of said third spring becomes larger and thereby said preset load of said second spring is changed so as to change the predetermined value at which the pressure in said vacuum modulating chamber is controlled.

2. A vacuum control valve as set forth in claim 1 further comprising:

a guide groove axially formed on the inner side wall of said housing, with which an outer edge of said cam follower is engaged so that said cam follower means is allowed to move only in an axial direction of said housing.

3. A vacuum control valve as set forth in claim 1 or 2, further comprising:

an air filter element disposed in said cam chamber for filtering air which flows into said valve chamber through said hole formed in said movable member.

* * * * *